United States Patent [19]

Krotz

[11] 4,428,773

[45] Jan. 31, 1984

[54] PROCESS FOR TREATING SPENT FLUIDS TO RECOVER COPPER AND COPPER OXIDE

[75] Inventor: Kenneth J. Krotz, Dupage, Ill.

[73] Assignee: Western Electric Company, Inc., New York, N.Y.

[21] Appl. No.: 454,803

[22] Filed: Dec. 30, 1982

[51] Int. Cl.³ .................... C01G 3/02; C22B 15/12
[52] U.S. Cl. .................................. 75/117; 204/96;
  204/108; 423/43; 423/604; 156/642; 134/13
[58] Field of Search ............... 75/108, 117, 101 R;
  204/96, 106, 141.5; 423/27, 43, 604, 34;
  156/642; 134/10, 13; 172/760

[56] References Cited

U.S. PATENT DOCUMENTS

| Re. 31,028 | 9/1982 | Cromwell | 172/760 |
| 3,976,500 | 8/1976 | Fadgen, Jr. | 423/32 |
| 4,252,621 | 2/1981 | Reinhardt et al. | 156/642 |

*Primary Examiner*—Edward J. Meros
*Assistant Examiner*—Robert L. Stoll
*Attorney, Agent, or Firm*—J. J. Jordan; R. F. Kip, Jr.

[57] ABSTRACT

A process for recovering copper and copper oxide for spent ammoniacal etchant, electroless and copper persulfate bath fluids used in the manufacture of copper printed wiring boards such that the treated baths contain no ammonia. The spent solutions are placed in a cooking vessel having its inner surface made of titanium and the formaldehyde is added. The ingredients are then stirred while air is bubbled through the ingredients until thoroughly mixed after which the pH of the mixture is adjusted to between 12.0 and 14.0. The adjusted mixture is now heated to a temperature within the range of 200°–210° F. and air is bubbled through the heated mixture until copper and copper oxide precipitates form in the mixture. After the precipitates form the mixture is allowed to cool to permit the precipitates to settle to the bottom of the vessel and the mixture is decanted from the vessel. The copper and copper oxide precipitates are washed and then collected.

15 Claims, 3 Drawing Figures

PROCESS FOR TREATING SPENT FLUIDS TO RECOVER COPPER AND COPPER OXIDE

TECHNICAL FIELD

This invention relates to a process for recovering increased amounts of copper and copper oxide from spent etchant, electroless and copper persulfate fluids and, more particularly, to recovering increased amounts of copper and copper oxide from spent fluids without ammonia being present in the fluids after completion of the process.

BACKGROUND OF THE INVENTION

During the manufacture of printed wiring boards, the board substrate is placed in a bath containing an etchant fluid for etching away parts of the copper circuit paths located on the surfaces of the substrate which parts have not been covered or coated during a previous step in the manufacturing process. A typical bath contains 500 gallons of etchant fluid and after continuous use the fluid becomes contaminated with copper etched from the dipped substrates. As the etchant fluid becomes more and more contaminated with copper it becomes less effective as an etchant until the fluid becomes spent and is no longer usable.

In another process for the manufacture of printed wiring boards, copper is added to circuit patterns present on the board substrate by dipping the substrate into a bath containing an electroless fluid. Such fluid typically comprises copper sulfate and ammonium hydroxide. Chemical reaction between the substrate circuit patterns and the bath fluid sets up an electric field which moves copper from the bath to the substrate and after being submerged in the bath for a certain period of time the circuit board is removed from the bath. As a final step in the electroless process the circuit board is dipped in a bath of copper ammonium persulfate to remove copper oxide from the surface of the copper circuits on the board and to "brighten up" the copper circuitry. As more and more substrates are processed the electroless and copper ammonium persulfate bath fluids become contaminated such that eventually they become spent.

When the etchant, electroless and copper ammonium persulfate fluids become spent they are pumped from the circuit board manufacturing baths to a processing area to recover copper and copper oxide present in the spent fluids. Present processing methods allow for recovery of only 70 to 75% of the copper and copper oxide in the spent fluids while also leaving ammonia in the finally treated solutions as an unwanted by-product of the process. In order to meet efluent discharge standards the ammonia must be removed from the final solutions prior to discharge of the solutions. Typically this is performed by a second treatment of the solutions to destroy the ammonia and further remove any soluable copper existing in the solutions, which second treatment is labor intensive and costly because of the additional chemicals required. Also, the treatment area requires additional ventilation to remove ammonia gas formed during the second treatment.

There is a need therefore for a process for treating spent etchant, electroless and copper persulfate fluids, or solutions, which increases recovery of the copper and copper oxide present in the spent fluids and which provides a final solution free of ammonia.

SUMMARY OF THE INVENTION

The above problems are solved by the present invention in which spent electroless ammoniacal etchant and copper ammonium persulfate fluids, or solutions, are treated in a process to recover copper and copper oxide while providing a final solution, or decant, free of ammonia. The process comprises placing the spent solutions and formaldehyde in a cooking vessel having its inner surface made of titanium. While bubbling air through the contents of the vessel, the contents are stirred to form a mixture and the pH of the mixture is then adjusted to be within the range of 12.0 to 14.0. The adjusted mixture is then heated to a temperature within the range of 200°–210° F. while bubbling air through the mixture until copper and copper oxide precipitates are formed. After the precipitates are formed the heated mixture is allowed to cool and the bubbling air is stopped to permit the precipitates to settle to the bottom of the cooking vessel after which the mixture is decanted from the vessel and the precipitates are washed to remove impurities. The precipitates are now removed from the vessel. The process allows for recovery of 90-96% of the copper and copper oxide present in the spent solutions with no ammonia present in the final solution. In an embodiment of the invention only spent ammoniacal etchant solution is processed to recover copper and copper oxide with no ammonia present in the treated decant solution.

In another embodiment of the invention a combination of spent electroless and copper persulfate solutions are treated to recover copper and copper oxide with no ammonia in the treated decant solutions.

BRIEF DESCRIPTION OF THE DRAWINGS

Other features and advantages of the invention, its organization, construction, and operation will be best understood from the following detailed description of a specific embodiment thereof, taken in conjunction with the accompanying drawings in which.

DETAILED DESCRIPTION

Figure 1:
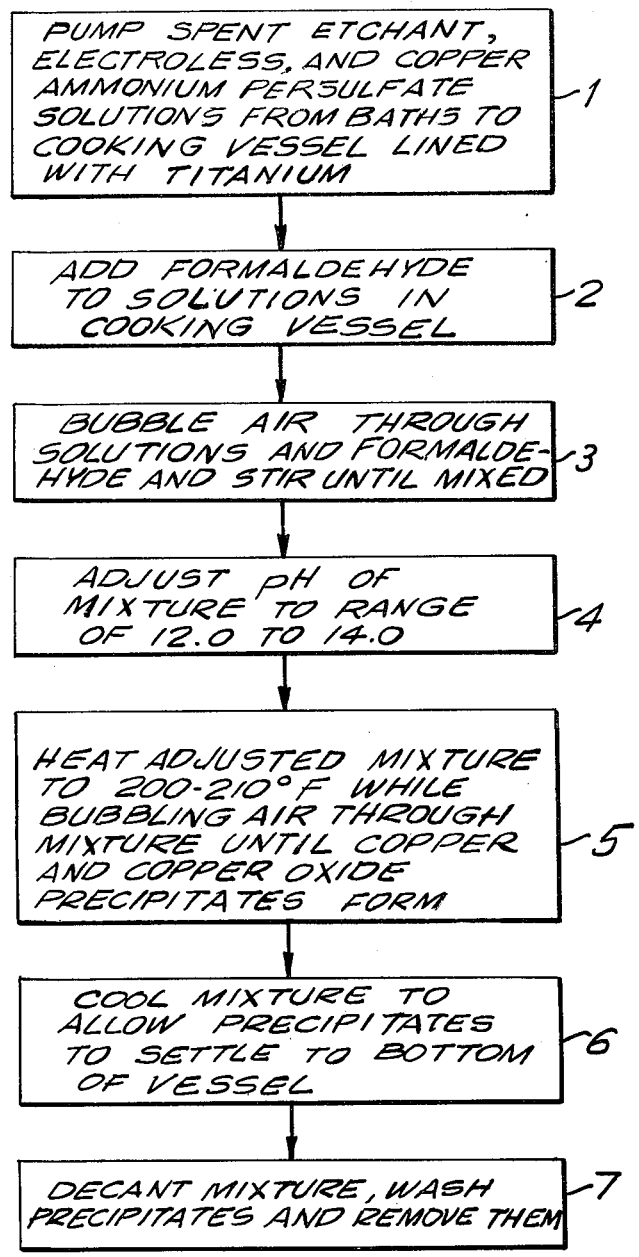
FIG. 1 is a diagram showing the steps in the process for treating spent electroless, copper ammonium persulfate and etchant solutions.

Referring now to FIG. 1 there is illustrated a flow chart showing the steps for processing spent etchant, electroless and copper ammonium persulfate bath solutions to recover copper and copper oxide with no ammonia remaining in the treated solutions. A typical etchant solution used in the manufacture of printed wiring boards is Etchant B Process Replinisher manufactured by MacDermot Inc., Waterbury, Conn., which solution is mainly ammonium hydroxide and ammonium chloride and can be called an ammoniacal solution. A typical electroless bath solution is PTH Electroless Copper 9072, PTH Accelerator 9071, and PTH Reducer 9073 manufactured by Southern California Chemical Inc. of Santa Fe Springs, Calif. which solution comprises mainly copper sulfate, ammonium hydroxide and edta chleating agents. After prolonged use in baths during the manufacture of printed wiring boards the solutions become spent, they become contaminated with impurities such as copper and copper oxide, and are no longer useful and are processed to recover the copper and copper oxide as seen in FIG. 1.

In FIG. 1, the spent solutions are pumped from the dipping baths in the printed wiring board manufacturing facility to a cooking vessel which has its inner surface lined with titanium or which is made of titanium. The manufacturing facility baths usually contain up to 500 gallons of solution so that the cooking vessel must be large enough to hold at least 1600 gallons of liquid. A cooking vessel which can be used herein is the Grade 2 Titanium Vessel manufactured by the Astro Metallurigical Co. of Wooster, Ohio. The vessel typically has a cover which is bolted onto the vessel during cooking and a number of orifices are located in the vessel for introducing fluids and gasses into it. For example, an orifice is located toward the bottom of the vessel to allow air to be pumped into the vessel and bubbled up through the contents of the vessel, while another orifice at the top can be connected to a steam line to permit steam to be fed into the vessel to leach the contents therein.

After approximately 500 gallons of spent electroless, etchant and copper ammonium persulfate solutions have been placed in the cooking vessel, formaldehyde is added to the cooking vessel as seen in step 2 of FIG. 1. One gallon of formaldehyde is added to approximately 14 gallons of spent solution in the cooker so that, in the present example, approximately 35 gallons of formaldehyde is added to the 500 gallons of spent solutions present in the cooker.

Next the spent solutions and formaldehyde are stirred to form a mixture. While the stirring step is being performed air is bubbled through the ingredients contained in the vessel at the rate of 120 cubic feet per minute. In order for the ingredients in the vessel to be thoroughly mixed it is best that the ingredients be stirred for at least an hour at ambient temperature. The stirring step can be achieved by a model AL4 mixer manufactured by the Cleveland Mixer Company of Downers Grove, Ill. The mixer, mounted on the bolted cover of the cooking vessel, has a stirring shaft which extends through the cover approximately 150 inches into the vessel to stir the contents of the vessel. A Cleveland right angle gear reducer rotates the shaft at 59 RPM during the stirring step.

As seen in step 4 of FIG. 1, the pH of the mixture is now adjusted to bring the pH within the range of 12.0 to 14.0. Typically this is done by adding an alkaline such as sodium hydroxide to the mixture. It has been discerned that the process achieves best recovery results when the pH of the mixture can be held within the range of 12.8 to 13.0.

After adjusting the pH of the mixture, the adjusted mixture is heated to a temperature within the range of 200°–210° F. (93.3°–98.9° C.) until copper and copper oxide precipitates are formed within the mixture. During the heating step, step 5 of FIG. 1, air is bubbled through the mixture at the rate of 120 cubic feet per minute. To achieve maximum precipitate of the copper and copper oxide in the mixture, the heating step should be performed for at least four hours by introducing live steam into the cooking vessel.

After the copper oxide and copper precipitates are formed the mixture is allowed to cool and air is no longer bubbled through the mixture to permit the precipitates to settle to the bottom of the vessel as seen in step 6 of FIG. 1. The mixture is now decanted from the vessel, the precipitates are washed (step 7), which is free of ammonia usually with deionized water, to remove impurities and the precipitates are recovered, typically from the bottom of the vessel by vacuum belt filtration to remove excess water, for resale.

The above process yields a recovery of over 90% of the copper oxide and copper present in the spent solutions while the decanted mixture contains no ammonia.

Since the electroless bath and the copper ammonium persulfate baths are typically located in a single printed wiring board manufacturing line, the spent fluids from these baths are usually combined and processed together to remove copper and copper oxide.

Figure 2:
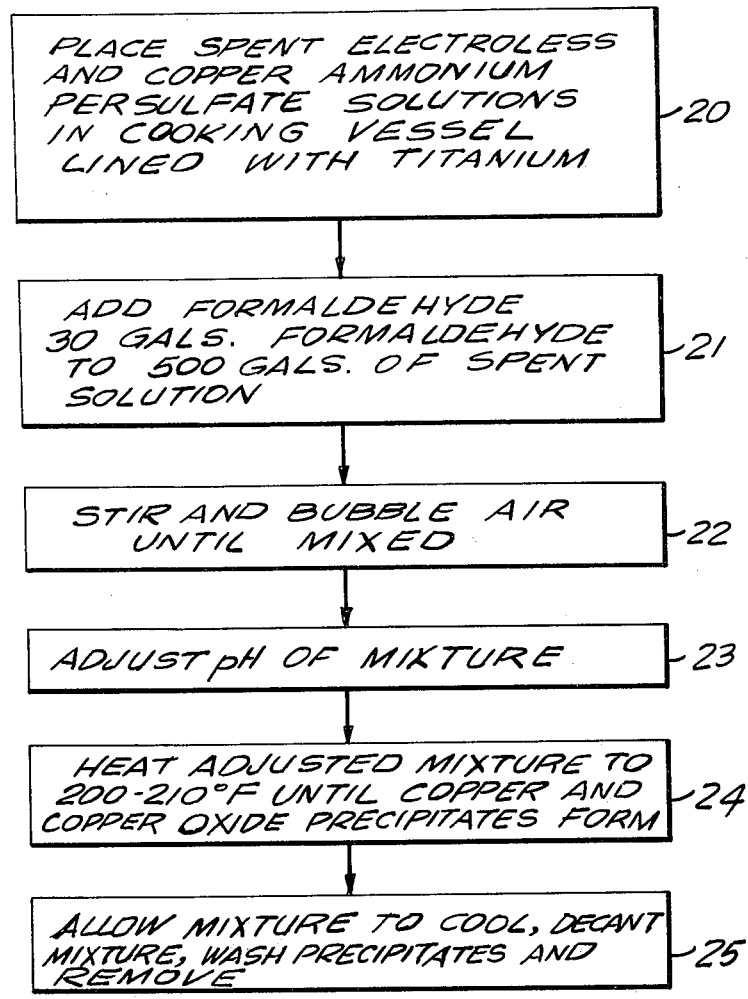
FIG. 2 is a diagram showing the steps in the process for treating a combination of spent electroless and copper ammonium persulfate solutions.

FIG. 2 represents an exemplary embodiment of the above described inventive process wherein in FIG. 2 only spent electroless and copper ammonium persulfate solutions are processed instead of the combined etchant, electroless and copper ammonium persulfate solutions described with relation to FIG. 1. In step 20 of FIG. 2, 500 gallons of the spent solutions are placed in a cooking vessel, similar to the vessel used above, having its inner surfaces lined with titanium. Typically the 500 gallons comprises approximately half electroless and half copper ammonium persulfate solutions. Thirty gallons of formaldehyde is then added to the contents of the vessel as seen in step 22 and the contents are stirred, while air is bubbled through the contents at the rate of 120 cubic feet/minute, for about an hour or until thoroughly mixed.

In step 23 of FIG. 2 the pH of the mixture is now adjusted within the range of 12.0 to 14.0 by adding, typically, sodium hydroxide to the mixture. For best results, that is recovery of greater than 90% of the copper and copper oxide, the pH of the mixture should be maintained at between 12.8 and 13.0.

The adjusted mixture is now heated (step 24, FIG. 2) in the vessel while bubbling air through the mixture at the rate of 120 cubic feet/minute. Typically, the mixture is heated by introducing live steam into the vessel, but any conventional heating arrangement will suffice, to heat the mixture to a temperature range of 200°–210° F. (98.3°–98.9° C.) until the copper and copper oxide forms into precipitates and the mixture becomes clear. The heating step should be accomplished in approximately six hours.

After the precipitates form, the mixture is allowed to cool and the bubbling air is turned off to allow the precipitates to settle to the bottom of the vessel at which time the mixture, which is free of ammonia, is decanted from the vessel and the precipitates are washed to remove contaminants (step 25). The clean copper and copper oxide precipitates are removed from the vessel and packaged for sale.

Figure 3:
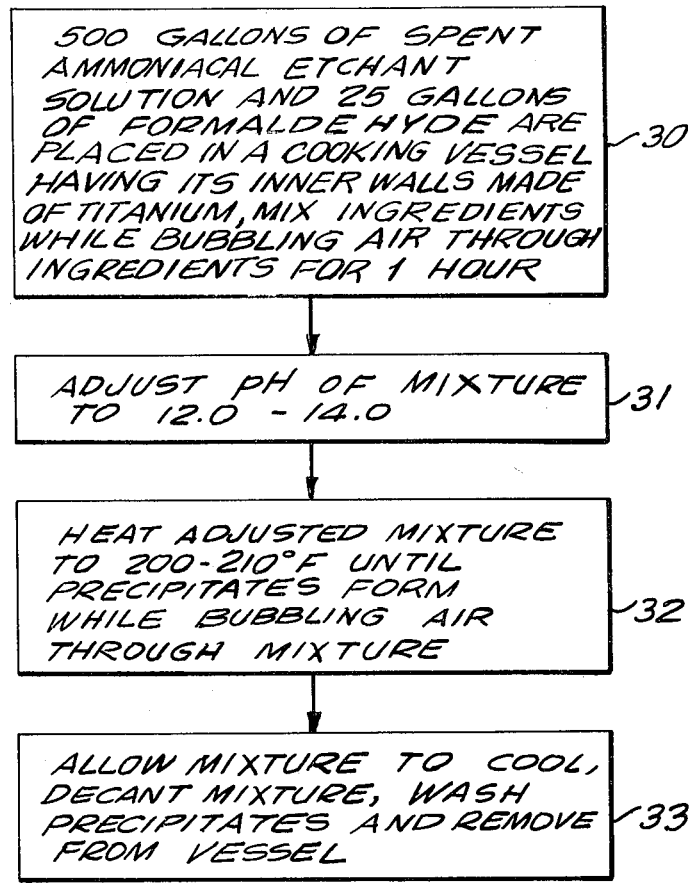
FIG. 3 is a diagram showing the steps in the process for treating spent etchant solution.

FIG. 3 represents another exemplary embodiment of the present inventive process wherein in FIG. 3 only spent ammoniacal etchant solution is processed to reclaim copper and copper oxide with no ammonia present in the treated decant solution. In step 30 of FIG. 3 500 gallons of the spent etchant solution and twenty-five gallons of formaldehyde are pumped into a cooking vessel having its inner walls made of titanium. The ingredients are stirred for approximately one hour at ambient temperature until the contents are mixed. Air is bubbled through the contents of the vessel at the rate of 120 cubic feet per minute while the contents are being stirred.

In step 31 of the pH of the mixture is adjusted to be within 12.0 to 14.0 by adding sodium hydroxide to contents of the vessel. For best recovery results, that is recovery of better than 90% of the copper in solution, the pH range should be maintained in the range of 12.8 to 13.0 and this can be accomplished by adding approximately 500 gallons of 20% sodium hydroxide to the mixture in the vessel.

In step 32 the adjusted mixture is heated to a temperature within the range 200°–210° F. (93.3°–98.9° C.) for approximately six hours, or until the copper and copper oxide precipitates form within the heated mixture. A typical way of heating the mixture is to introduce live steam into the vessel. While the mixture is being heated air is continuously bubbled through the heated mixture at the rate of 120 cubic feet per minute.

Step 32 can also be accomplished by heating the mixture to a temperature of 200° to 210° F. (93.3°–98.9° C.) and bubbling air through the mixture at a rate of 120 cubic feet of air per minute until the mixture becomes clear in color and precipitates are floating in the clear mixture.

After precipitates are formed in the mixture, the mixture is allowed to cool and air is no longer bubbled through the mixture to permit the precipitates to settle to the bottom of the vessel in step 33. The mixture is then decanted from the vessel and, after washing to remove impurities, the precipitates are removed from the bottom of the vessel to be packaged for sale.

The above processes have yielded recovery of up to 96% of the copper and copper oxide present in the solutions processed while not producing any ammonia as a final byproduct of the processes. The processes have achieved substantial savings in not requiring elaborate batch decant treatment, ventilation and alarm systems in the processing area to handle ammonia while also producing increased earnings through increased copper and copper oxide recovery.

it will also be apparent that one skilled in the art may make various modifications and changes to the methods disclosed herein without departing from the spirit and scope of this invention.

What is claimed is:

1. A process for recovering copper and copper oxide from a combination of spent ammoniacal etchant, electroless and copper ammonium persulfate bath solutions used in the manufacture of printed wiring boards and for producing an ammonia free decant solution comprising the steps of:
   placing the combination and formaldehyde in the ratio of approximately one gallon of formaldehyde per fourteen gallons of the combination in a cooking vessel having its inner surface coated with titanium;
   stirring and bubbling air through the contents of the vessel;
   adjusting the pH of the mixture to be within the range of 12.0 to 14.0; and
   heating the adjusted mixture to a temperature of 200°–210° F. (93.3°–98.9° C.) while bubbling air through the mixture until copper and copper oxide precipitates are formed in the heated mixture such that the mixture is ammonia free.

2. A process as recited in claim 1 comprising the additional steps of:
   cooling the heated mixture to permit the copper and copper oxide precipitates to settle to the bottom of the vessel;
   decanting the ammonia free mixture from the vessel; and
   washing the copper and copper oxide precipitate to remove impurities.

3. A process as recited in claim 1 wherein the stirring step is performed for at least an hour.

4. A process as recited in claim 1 wherein the adjusting step is performed by adding sodium hydroxide to the mixture until the pH of the mixture is between 12.8 and 13.0.

5. A process as recited in claim 1 wherein the heating step is performed by discharging live steam into the mixture for at least four hours.

6. A process as recited in claim 1 wherein air is bubbled through the mixture during the stirring and heating steps at the rate of 120 cubic feet per minute.

7. A process for treating spent ammoniacal etchant, electroless and copper ammonium persulfate bath solutions to recover copper and copper oxide from the solutions and to form an ammonia free decant mixture comprising the steps of:
   placing the spent solutions in a vessel having its inner surface made of titanium;
   adding formaldehyde to the solutions in the proportion of 1 gallon of formaldehyde to approximately 18.3 gallons of spent solutions;
   stirring the solutions at ambient temperature;
   bubbling air through the solutions at the rate of 120 cfm while the solutions are being stirred;
   adding sufficient sodium hydroxide to the mixture until the pH of the mixture is adjusted to be within the range of 12.8 to 13.0; and
   heating the adjusted mixture until copper and copper oxide precipitates are formed in the mixture while bubbling air through the heated mixture to form an ammonia free mixture suitable for decanting.

8. A process as recited in claim 7 wherein:
   the heating step is achieved by applying live steam to heat the mixture in the vessel for approximately four hours to a temperature of 200°–210° F.

9. A process as recited in claim 7 further comprising the steps of:
   cooling the mixture to allow the precipitates to settle to the bottom of the vessel;
   decanting the cooled ammonia free mixture from the vessel;
   washing the precipitates to remove impurities; and
   removing the cleaned precipitates from the bottom of the vessel by vacuum belt filtration to remove excess water.

10. A process for treating spent electroless plating and copper ammonium persulfate bath solutions to prevent ammonia from forming in the treated solutions and to recover copper and copper oxide from the spent solutions comprising the steps of:
   placing the spent solutions in a vessel having its inner surface made of titanium;
   adding formaldehyde to the vessel in the ratio of approximately three gallons of formaldehyde to five gallons of the spent solutions;
   stirring the contents of the vessel while also bubbling air through the stirred contents;
   adjusting the pH of the mixture until the pH is within the range of 12.0 to 14.0; and
   heating the adjusted mixture in the vessel while bubbling air through the mixture until copper and copper oxide precipitates are formed in the mixture such that the mixture is free of ammonia.

11. A process as recited in claim 10 wherein the final heating step is continued until the mixture becomes substantially colorless.

12. A process as recited in claim 10 wherein during the heating step the mixture is heated to a temperature in the range of 200°–210° F. by discharging steam into the mixture.

13. A process as recited in claim 10 comprising the additional steps of:
   cooling the ammonia free mixture to permit the copper and copper oxide precipitates to settle to the bottom of the vessel;
   decanting the mixture from the vessel; and
   washing the copper and copper oxide precipitates with deionized water to remove impurities from the precipitates.

14. A process for treating a spent ammoniacal etchant bath solution used in the manufacture of copper printed wiring boards to prevent the formation of ammonia in the treated solution and to recover copper and copper oxide from the solution comprising the steps of:
   placing the spent solution in a vessel having its inner surface made of titanium;
   adding formaldehyde to the solution in the quantity of approximately 1 gallon formaldehyde to 20 gallons of spent etchant solution;
   stirring the contents of the vessel while bubbling air through the contents;
   adjusting the pH of the mixture to within the range of 12.0 to 14.0; and
   heating the adjusted mixture while air is being bubbled through the adjusted mixture until copper and copper oxide precipitates are formed in the heated mixture or until the mixture becomes substantially colorless such that the mixture is ammonia free.

15. A process as recited in claim 14 comprising the additional steps of:
   cooling the heated ammonia free mixture to allow the copper and copper oxide precipitates to settle at the bottom of the vessel;
   decanting the ammonia free mixture from the vessel; and
   washing the copper and copper oxide precipitates to remove impurities.

* * * * *